US012258253B2

(12) United States Patent
Comin

(10) Patent No.: US 12,258,253 B2
(45) Date of Patent: Mar. 25, 2025

(54) SYSTEM FOR INTRODUCING AN ADDITIVE INTO A CONTAINER COMPRISING A STATIC MICRODOSER

(71) Applicant: SOCIETE DES PRODUITS NESTLE S.A., Vevey (CH)

(72) Inventor: Andrea Comin, Nancy (FR)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 80 days.

(21) Appl. No.: 17/904,541

(22) PCT Filed: Feb. 17, 2021

(86) PCT No.: PCT/EP2021/053801
§ 371 (c)(1),
(2) Date: Aug. 18, 2022

(87) PCT Pub. No.: WO2021/165278
PCT Pub. Date: Aug. 26, 2021

(65) Prior Publication Data

US 2023/0091547 A1 Mar. 23, 2023

(30) Foreign Application Priority Data

Feb. 20, 2020 (EP) .................................... 20158503

(51) Int. Cl.
*B67C 3/20* (2006.01)
*B65B 3/12* (2006.01)

(52) U.S. Cl.
CPC ................ *B67C 3/208* (2013.01); *B65B 3/12* (2013.01)

(58) Field of Classification Search
CPC ...................................................... B67C 3/208
(Continued)

(56) References Cited

U.S. PATENT DOCUMENTS 4,588,001 A 5/1986 Leonard
4,840,014 A * 6/1989 Takehana ............... B67C 3/222 141/5

(Continued)

FOREIGN PATENT DOCUMENTS

| | | |
|---|---|---|
| EP | 3178781 | 6/2017 |
| WO | 2011049505 | 4/2011 |
| WO | 2020202057 | 10/2020 |

OTHER PUBLICATIONS

Argentina Office Action for Appl No. 20210100435 dated May 17, 2024, 6 pages.

*Primary Examiner* — Jason K Niesz
(74) *Attorney, Agent, or Firm* — K&L Gates LLP

(57) ABSTRACT

The invention relates to a system for introducing an additive into a container (2). The system comprises an automated device for transporting the container (2) in a horizontal plane (P), such as a rotary wheel. The system further comprises a static microdoser (5) having a nozzle from which a jet (7) of an additive issues upon passage of an opening of the container (2). Additive is so injected into said container (2). According to the invention, the nozzle of the static microdoser (5) is inclined relative to a direction orthogonal to said horizontal plane (P). This limits splashing, in particular when the jet (7) of additive hits an inner wall of the container (2) that is free of liquid. This can be facilitated by an acceleration applied on the container (2) which inclines the free surface (8) of the liquid material present in the container (2). A preferred application is the introduction of a flavored concentrate into a bottle of water.

20 Claims, 8 Drawing Sheets

(58) Field of Classification Search
USPC .......................................................... 141/145
See application file for complete search history.

(56) References Cited

U.S. PATENT DOCUMENTS

| | | | | |
|---|---|---|---|---|
| 5,523,112 | A | 6/1996 | Carns et al. | |
| 5,791,385 | A | 8/1998 | Stahlecker | |
| 5,955,132 | A | 9/1999 | Spica et al. | |
| 9,440,205 | B1 | 9/2016 | Miller et al. | |
| 2004/0261893 | A1* | 12/2004 | Schultz | B67C 3/222<br>141/82 |
| 2018/0353915 | A1* | 12/2018 | Chen | B01F 25/28 |

* cited by examiner

SYSTEM FOR INTRODUCING AN ADDITIVE INTO A CONTAINER COMPRISING A STATIC MICRODOSER

CROSS REFERENCE TO RELATED APPLICATIONS

The present application is a National Stage of International Application No. PCT/EP2021/053801, filed on Feb. 17, 2021, which claims priority to European Patent Application No. 20158503.1, filed on Feb. 20, 2020, the entire contents of which are being incorporated herein by reference.

FIELD OF THE INVENTION

The present invention concerns the technical field of industrial facilities for filling containers such as bottles with a liquid product, such as bottling machines and bottling lines.

In the present document, the invention is described in relation with bottle filling. The term bottle designates any type of bottle of any size, from flacons to large bottles. Although the invention is more particularly described in the present document in relation to bottle filling, and is particularly suited for such application, it encompasses filling of other similar containers such as for example cans or cardboard containers.

The invention relates more particularly to the addition of an additive into a bottle (or another container) filled (at least partially) or not filled with another liquid material hereafter called "main liquid material". In the food industry, the additive may typically be an edible flavoring concentrate, and the main liquid material in the bottle may be any liquid beverage product base such as water, soda, lemonade, a soup, and so on.

The term "additive" relates in the present document to a liquid component, or to a liquid component comprising small solid particles.

The present invention even more particularly relates to static-microdosers, which is one of the two known technologies for introducing a small quantity of an additive into a bottle, as hereafter detailed. While the term "microdoser" generally designates a device for dosing a fluid in the microliter range, it should be noted that it is used in the present document to designate a device, which is able to dose a fluid up to one or a few milliliters.

BACKGROUND OF THE INVENTION

A common way to fill bottles or other containers in an industrial facility uses a bottling machine comprising a rotary filling wheel or carousel. The filling carousel is essentially a rotary wheel or rotor of large diameter comprising holding and filling arrangements on its perimeter. Bottles are brought to the holding means of the carousel, and then filled while the carousel rotates through a certain rotation angle. The bottling machine generally comprises at least a first transfer wheel or conveyor to feed empty bottles to the carousel, and at least a second transfer wheel or conveyor to transfer filled bottles to a further device comprised in the filling machine or outside the machine. A transfer wheel is a wheel whose function is to receive a container from a first apparatus or another transfer wheel and, by rotation about its axis, transfer the container to a second apparatus or another transfer wheel.

In the present document, the expression "rotary wheel" designates either a transfer wheel or a filling carousel, as they share essentially the same configuration, i.e. the same bottle-holding configuration, while the wheel is rotating.

The preparation of liquid, for example in the food industry, may require incorporating a small quantity of an additive into a bottle, empty or partly filled with a main liquid material. For example, to create flavored water, an aroma, which is a liquid having a highly concentrated flavor, may be introduced in a bottle after the bottle is filled with water.

The additive may be introduced into the bottle by two known alternative methods. First, a rotary microdoser may be added upstream or downstream the filling carousel. The rotary microdoser usually comprises a small rotary wheel with bottle holding means and filling valves installed on it to introduce the additive into the bottles while they travel through a certain angle of the rotary wheel. In other words, introducing an additive into a bottle is performed like the filling of the main liquid material, but using a smaller carousel and dosing valves configured to dose smaller volumes.

A variant of the rotary microdoser described above, consists in a configuration without bottle holding means. Document U.S. Pat. No. 5,955,132 discloses such system, wherein to introduce a flavor or essence, a rotary liquid dispensing machine is used. According to this document, the containers, which have previously been filled to a predetermined level with a beverage, are moved in a train along a predetermined path. A plurality of flavor or essence dispensing nozzle openings are rotated about an axis transverse to the container path, so that successive nozzle openings, when moving along the bottom portion of the arc of their motion, are positioned over and for a time move along with the containers.

However, a bottling machine comprising a rotary microdoser takes up space could be hard to retrofit on a filler already installed and is a complex system being composed by a plurality of valves in movement.

Another known solution to introduce a small quantity of liquid into a bottle is the use of a device called "static microdoser". A static microdoser consists of a fixed device configured to generate a jet of pressurized additive when a bottle mouth passes under a nozzle of the microdoser. The static microdoser may typically, but not exclusively, be positioned above a rotary wheel of the bottling machine. Such a device is typically used for introducing a very small quantity of liquid nitrogen into beverage bottles.

Document U.S. Pat. No. 9,440,205 describes some aspects of microdosing systems.

While static microdosers are simple and easy to use devices, they have drawbacks. The quantity of liquid that may be introduced with such a device is very limited, due to the limited time available for injection. The time available for injection is defined by the time of passage of the opening (mouth, opened neck) of a bottle under the injection nozzle. Use of a static microdoser is thus limited to the introduction of very small quantity of additive into a bottle. It can for example hardly be used to introduce an aroma for producing flavored drinkable water. To maximize the quantity of additive introduced by a static microdoser, the injection flowrate of the injected additive must be increased. When additive is injected into the bottle at a high flow rate, the risk of splashing in reaction to the incoming jet of additive is high. This may result in a loss of liquid from the bottle, i.e. a loss of main liquid material present in the bottle before injection of additive, and/or a loss of additive injected into the bottle.

Such loss of liquid is problematic.

First, the quantity of additive in the final product (composed of the main liquid material and additive(s)) is variable. However, the additive is generally a very concentrated product. For example, in the case of flavored waters, the typical ratio of additive over main liquid material in the final product is comprised between 1 to 5 volumes of flavors (additive) to 1000 volumes of water (main liquid material). A small variation in quantity of additive can thus strongly affect the quality of the final product, for example its taste. Any product splash can be a source of uncertainty in the dosing ratio (additive weight over main liquid material weight). It reduces the accuracy of the finished product nominal weight.

Second, splashing on the outside surface of the neck of the bottle or splashing on the bottling line is not acceptable for a food product. It can promote microbiological development. Splashing of additive may be acceptable only if the fluid evaporates without leaving any trace on the bottle, as liquid nitrogen does. That is why static microdosers are commonly used only for introduction of liquid nitrogen into a container.

The invention aims to provide a device for introducing an additive into a bottle using a static microdoser that efficiently reduces the risk of splashing when the additive is injected in a container such as a bottle, to improve the dosing precision and to improve hygiene.

SUMMARY OF THE INVENTION

The objective set out above is met with a system for introducing an additive into a container. The system comprises an automated device for transporting the container along a trajectory in a horizontal plane, the system further comprising a static microdoser having a nozzle from which a jet of an additive issues upon passage of an opening of the container in proximity to the nozzle to introduce the additive into said container. The nozzle of the static microdoser is inclined relative to a direction orthogonal to said horizontal plane.

The system provided according to the invention makes it possible to avoid or limit splashing upon injection by a static microdoser of an additive into a container. This technical advantage is obtained thanks to the inclination of the nozzle of the static microdoser, which leads to a jet of additive, which is inclined relative to the travel path of the containers. Thanks to this inclination, splashing is limited. In various embodiments of a system according to the invention, the inclination of the nozzle depends on many parameters, comprising the geometry of the automated device for transporting the containers, the shape and the size of the opening of the containers.

According to a preferred embodiment of the invention, the nozzle of the static microdoser is inclined such that said the jet of additive enters into the container through the opening and hits a lateral inner wall of said container. According to this embodiment, the additive hits the lateral inner wall of the bottle first, and flows along this wall to reach the main liquid material present in the container. The velocity of the additive is reduced before it reaches the main liquid material, and a flow along the lateral inner wall of the container creates much less turbulence in the main liquid material than a jet directly hitting said main liquid material surface.

The container may be partially filled with a main liquid material before introduction of the additive, and the lateral inner wall hit by the jet of additive may be situated above a free surface of the main liquid material. Thanks to its inclination, the jet of additive hits the inner wall of the container above the free surface of the main liquid material. The adjustment of the non-orthogonal impact angle makes it possible to limit or avoid splashing.

The automated device for transporting a container may apply an acceleration to said container, said acceleration having at least a horizontal component causing the free surface of the main liquid to be at angle with the horizontal plane. The free surface of the main liquid thus has a highest level and a lowest level in the container. The nozzle of the static microdoser may be placed such that the jet of additive hits the free lateral inner wall on the side of the container where the level of main liquid material is the lowest.

Thanks to the horizontal acceleration being applied to the container, the free surface of the main liquid material present in the container is not horizontal. This frees, from main liquid material, on one side of the container situated where the surface of the main liquid material is the lowest, a given height of lateral inner wall above the free surface of the main liquid material. This extra height of free lateral wall is advantageously used to receive the jet of fluid additive inside the container, at distance from the opening.

The automated device for transporting the container comprises a conveyor configured to transport the container along a linear or curved trajectory.

The automated device for transporting the container may be of many types. It may for example be a conveyor belt, configured to transport the containers along a linear trajectory. The automated device for transporting the container can alternatively comprise a curved rail or guide, which defines a curved trajectory.

The automated device for transporting a container may comprise a rotary wheel which transports the container along a circular-arc-shaped trajectory around an axis of rotation of the rotary wheel, thus applying a centrifugal force on the container, said centrifugal force forming the horizontal component of the acceleration on said container.

A rotary wheel, such as a container transfer wheel or a carousel, is a kind of device often used in industrial bottling lines. Use of a rotary wheel as automated device for transporting containers in a system according to the invention makes it possible to benefit from the centrifugal force applied to the container to free a lateral inner wall of the container from liquid material. The injection of additive is advantageously performed on the inner wall of the container situated above the lowest level of main liquid material subject to the centrifugal force of the rotary wheel.

In other word, the nozzle is advantageously inclined and oriented in a direction towards the axis of rotation of the rotary wheel.

Furthermore, when a rotary wheel is used in the invention as automated device for transporting containers, the injected additive will spiral down along the wall before hitting the liquid due to the relative speed of the bottle in the horizontal plane relative to the jet of additive. This slows down the injected fluid additive and minimizes its impact on the main liquid material already in the bottle. More particularly, the additive can reach the surface of the main liquid material with a certain tangential movement that limits turbulence (and splashing risk) caused by said injection.

The nozzle may be inclined such that the orthogonal projection of a direction of the jet of additive on a vertical plane containing the nozzle and which is orthogonal to a tangent of the trajectory forms a first angle $\beta$ with a vertical line passing through the nozzle, and wherein $\beta$ is an acute angle.

The first angle β may be said to be negative when the jet is substantially directed towards the axis of rotation, and β may advantageously be a negative angle. The first angle β may for example be comprised between −60° and −5°, preferably between −40° and −15°, and more preferably between −30° and −25°.

The optimum value of the first angle β has been studied by the applicant. When the first angle β is close to zero, the jet of fluid additive is almost vertical and the technical effect sought in the invention is weakly obtained. When the first angle β is close to 90°, the jet of fluid additive is almost horizontal. The jet of additive hits the inner wall of the container at an angle that can cause a splash-up phenomenon that must be avoided. Such configuration can also reduce the available time for injection. For the main envisioned applications of the invention, in the field of bottling, and depending on the shape of the bottle into which additive is injected, splashing has been fully avoided with a first angle β comprised between 25° and 30°.

The nozzle may be inclined such that the orthogonal projection of a direction of the jet of additive on a plane which:

- contains the nozzle,
- is vertical, and
- is orthogonal to a plane containing the nozzle and which is orthogonal to a tangent to the trajectory, forms a second angle α with a vertical line passing through the nozzle.

The second angle α may be considered positive when the jet is inclined in a direction substantially opposite to the movement of the container in the horizontal plane, and the second angle α may for example be comprised between −10° and 10°.

The second angle α can be adjusted, in some embodiments, to create or enhance a spiraling flow of the additive on the inner wall of the container before it reaches the surface of the main liquid material.

The container may have a lateral inner wall having a rounded or cylindrical shape, and the container may have a central axis. The static microdoser may be positioned such that the jet of additive crosses the opening of the container at a distance (d) from the central axis of the container (2).

Because the jet of additive enters into the container offset from its central axis, the jet reaches the lateral inner wall of the container with a non-orthogonal orientation. In other words, the jet has a tangential component relative to the rounded (e.g. cylindrical) inner wall, and will tend to follow said wall and to spiral down along said wall. The system may comprise a microdoser assembly comprising a plurality of static microdoser nozzles along the trajectory of the container, each static microdoser nozzle having a same inclination relative to the container upon passage of the opening of the container.

The system may for example comprise between two and six static microdoser nozzles.

The number of static microdoser nozzles may be adjusted according to the total quantity of additive to be introduced into the container and according to the size of the opening of the container, which determines the time available for additive injection. It is generally difficult to use a microdoser to introduce more than 1 mL of fluid into a bottle having a standard bottleneck having a 20-25 mm diameter as opening. For example, to introduce around 5 mL into a 1 L bottle, five microdoser nozzles are necessary. Furthermore, multiple microdoser nozzles can be used to reduce the quantity of fluid injected by each nozzle.

The container may be a bottle having a mouth as opening or a can having an open top face for filling.

The main liquid material may be one of water, a soda, lemonade, and a soup.

The additive may be an edible flavoring concentrate, a mineral concentrate, or a functional concentrate such as an additive comprising a vitamin, caffeine or another coffee extract.

The invention also relates to a method for preparation of a bottled liquid product, the method comprising:

- transporting a container along a trajectory in a horizontal plane;
- injecting, during the transporting step, an additive into the container with a static microdoser as a jet of additive inclined relative to a direction orthogonal to said horizontal plane.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION

Figure 1:
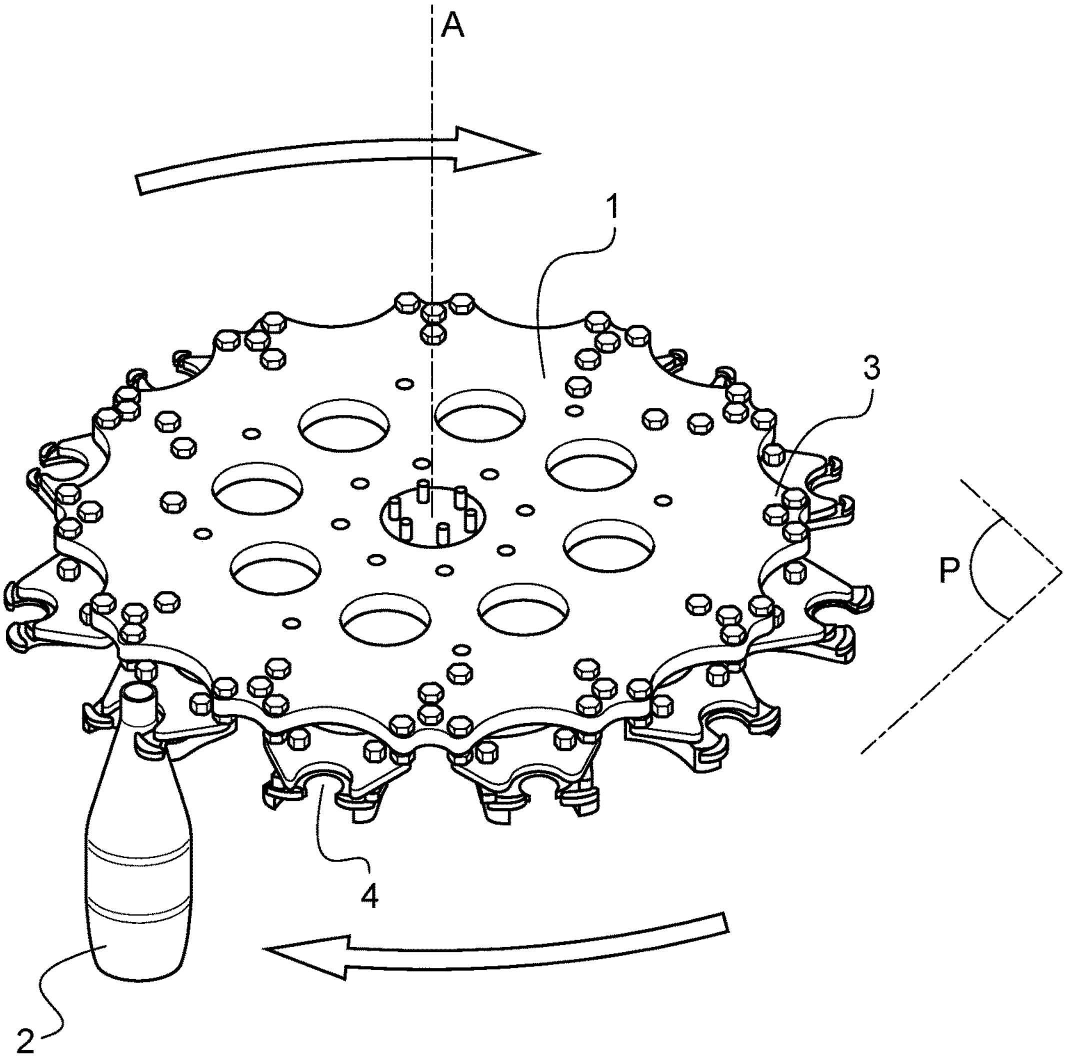
FIG. 1 is a three-dimensional schematic view of a rotary wheel for transporting a container.

FIG. 1 is a three dimensional schematic view of a rotary wheel 1 for transporting a container 2, namely a bottle, for example a plastic bottle such as a PET bottle. The rotary wheel 1 comprises a rotor 3, which extends and rotates in a horizontal plane P around a vertical axis of rotation A. The rotary wheel 1 comprises holding means 4 on its perimeter. The holding means 4 are configured to maintain, for example by grasping, the container in a fixed position relative to the rotor 3. Although the holding means 4 are represented by way of example as being grasping means, many other types of holding means for a rotary wheel are known in the state of the art and can be used in the invention. When the rotary wheel rotates, the container 2 is thus transported in a horizontal plane. More particularly, each container 2 transported by the rotary wheel 1 describes a circular-arc-shaped trajectory in a horizontal plane (horizontal plane P of the rotor 3, or, more generally, a plane which is parallel to the horizontal plane P of the rotor).

A static microdoser can be installed above the perimeter of the rotor, i.e. above the trajectory described by an opening of the container 2 (e.g. mouth of a bottle). Such configuration is schematically represented in FIG. 2.

Figure 2:
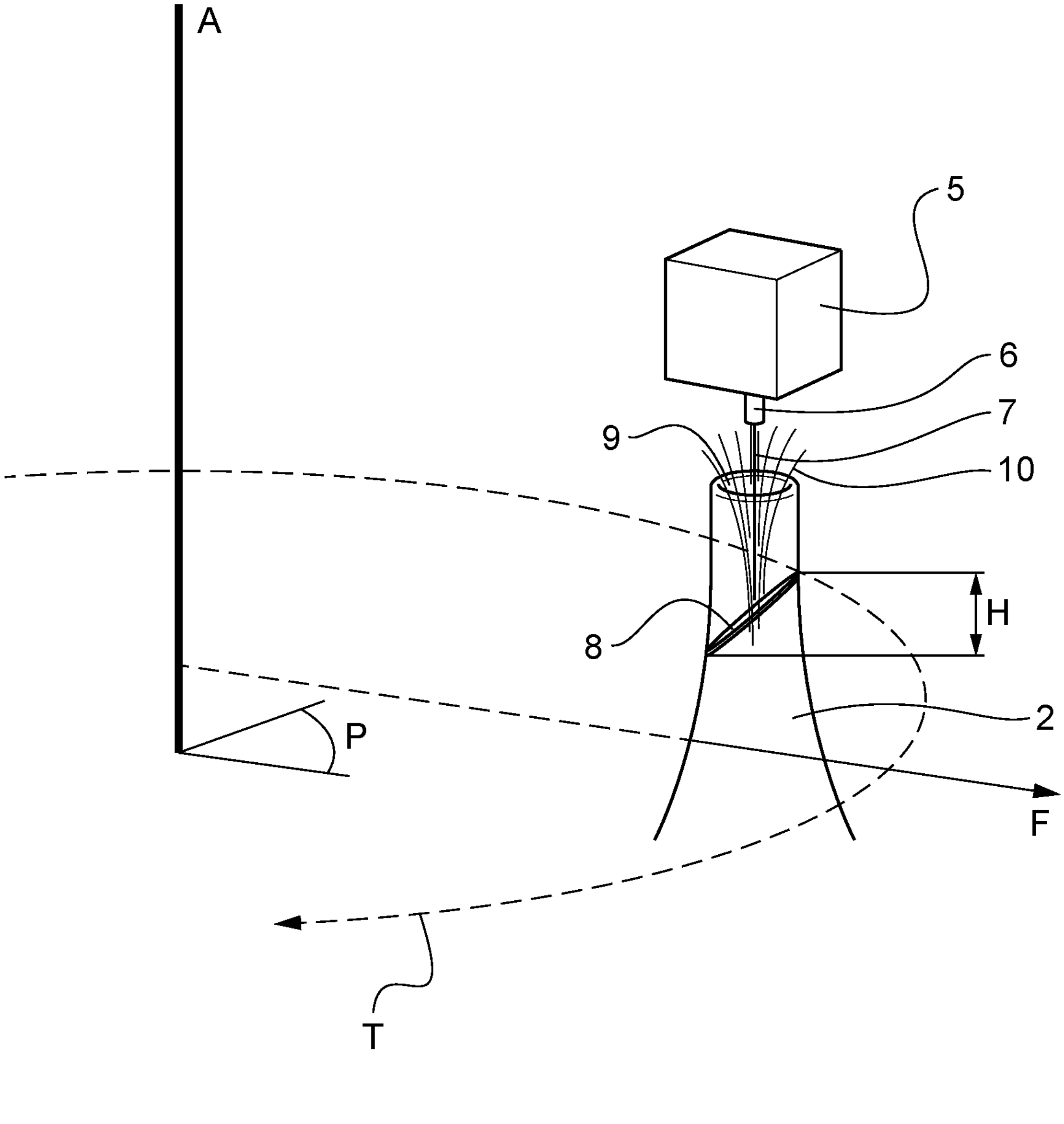
FIG. 2 is a three-dimensional schematic view showing a static microdoser installed above a rotary wheel to introduce an additive into a container, according to the prior art.

FIG. 2 shows a static microdoser 5 positioned in such configuration. The rotary wheel is omitted in FIG. 2, and is represented by its axis of rotation A. The container 2 is partially and schematically represented, and describes the arc-shaped trajectory T around the axis of rotation A, in the horizontal plane P. The arc-shaped trajectory T is defined by the periphery of the rotor 3. The static microdoser 5 comprises a nozzle 6. The static microdoser 5 is synchronized with the rotary wheel 1. In other words, the actuation of the static microdoser 5 to inject a fluid additive is controlled depending on the angular position of the rotor 3. This ensures that a container opening is present under the static microdoser when fluid additive is injected. A jet 7 of additive issues from the nozzle 6 when the container opening approaches said nozzle 6. The jet 7 is generated by opening a dosing valve of the microdoser. The jet 7 is stopped by closing the dosing valve. The dosing valve may be controlled for example via an actuator device. A control system may provide the synchronization between the bottle displacement and the dosing valve opening, in consideration of the jet speed, nozzle position and orientation, bottle speed and acceleration.

The container 2 (i.e. the bottle) is partially filled with a main liquid material. By "partially" it is meant that a sufficient space remains between the free surface 8 (also simply called surface) of the main liquid material and the opening 9 of the container for introduction of the desired quantity of additive. The jet 7 enters into the container through the opening 9. The jet hits the free surface 8, which, depending on the jet velocity, the amount of additive, etc., can cause splashing 10 of liquid (main liquid material and/or additive) out of the container 2.

Although FIG. 2 illustrates a system according to the state of the art, it also discloses a physical phenomenon that is usually ignored or at least that is not used in the prior art, of which the present invention takes advantage in some embodiments. As represented in FIG. 2, the surface 8 of the main liquid material does not remain horizontal when the rotary wheel rotates. Indeed, the container and the liquid contained in said container are subject to a centrifugal force F.

The centrifugal force F is an inertial force (also called a "fictitious" or "pseudo" force) that appears to act on all objects when viewed in a rotating frame of reference (i.e. in a rotating system of coordinates). The centrifugal force is oriented in a radial direction, which is orthogonal to the axis of rotation, and crosses said axis of rotation. In the present case, the axis of rotation of the system is also the axis of rotation A of the rotary wheel.

This force or acceleration applied to the main liquid material causes an inclination of its free surface 8. Consequently, the free surface 8 of the main liquid material is lower towards the axis of rotation A of the rotary wheel and higher towards the outside of the rotary wheel.

The effect of this centrifugal acceleration on the main liquid material is not negligible. For example, in a conventional 1 L bottle the height H between the lowest level and the highest level of the main liquid material may typically be comprised between 10 mm and 20 mm, depending on the configuration of the bottle and the radius and angular speed of the transfer wheel.

Figure 3:
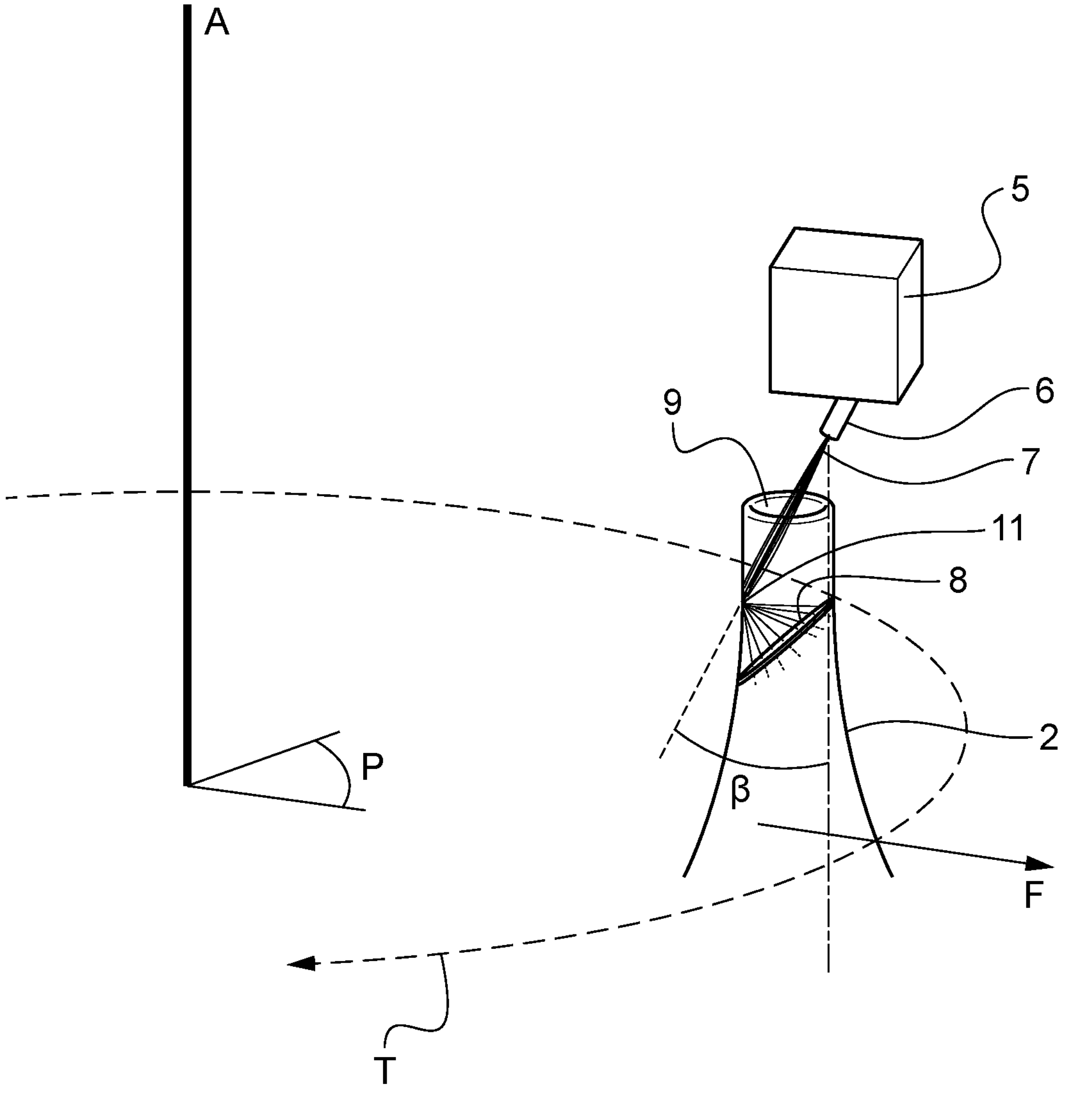
FIG. 3 is a three-dimensional schematic view showing a static microdoser installed above a rotary wheel to introduce an additive into a container, according to a first embodiment of the invention.

FIG. 3 shows, according to a similar view as FIG. 2, an embodiment of the invention. The above description of FIG. 2 applies to FIG. 3, except for the configuration of the static microdoser 5. The static microdoser has, according to the invention, a nozzle 6 inclined to generate a jet 7 of additive that is also inclined relative to a direction orthogonal to the horizontal plane P. In other words, in the present embodiment, the nozzle 6 is inclined relative to the vertical axis of rotation A. In the present embodiment, the jet 7 is inclined in a direction towards the axis of rotation A, i.e. the direction in which the jet 7 extends crosses the axis of rotation A. More particularly, the jet 7 is inclined compared to the vertical direction of a first angle β.

Because the jet 7 can also be inclined in another direction, the first angle β can be more generally defined as follows. The orthogonal projection of the direction of the jet 7 on a plane containing the axis of rotation of the rotary wheel 1 and the nozzle 6 forms the first angle β relative to a vertical line passing through the nozzle 6. To orient the first angle β, it is considered by convention that β is positive when the jet 7 diverges from said axis of rotation A. In other words, β is negative when the jet 7 is substantially directed towards the axis of rotation (A). Thus, when the nozzle 6 is oriented in a direction towards the axis of rotation β is negative. The direction of the jet is defined by the straight line between the nozzle and the point of impact of the jet on a surface, or, when jet is slightly cone-shaped, to the main axis of said cone formed by the jet.

This definition of β applies to an embodiment of the invention in which the additive is introduced into a container when this container is transported in a horizontal plane by a rotary wheel. As described hereafter, embodiments of the invention may alternatively comprise other types of automated devices for transporting the container along a trajectory T in the horizontal plane. In such case, the first angle β is more generally defined as the angle formed between the orthogonal projection of a direction of the jet of additive on a vertical plane containing the nozzle and which is orthogonal to a tangent of the trajectory and a vertical line passing through the nozzle.

By "vertical" is meant orthogonal to "horizontal", i.e. orthogonal to the plane comprising the trajectory T.

In the system of FIG. 3, the plane comprising the nozzle 6 and the axis of rotation A of the rotary wheel is vertical and orthogonal to a tangent of the circular-arc-shaped trajectory T: the definition of β is thus consistent.

The inclination of the jet 7 limits or avoids splashing when additive is injected into the container 2. This limitation is more particularly obtained when the jet 7 of additive which enters the container 2 first hits a lateral inner wall 11 of the container that is free of main liquid material, that is to say an inner wall 11 of the container that is above the free surface 8.

After the jet 7 of additive has hit the lateral inner wall 11 of the container and because of the relative speed between the container 2 and the jet 7, the fluid additive spirals down along the wall of the container before reaching the liquid.

This slows down the injected fluid and minimizes the impact energy of the fluid additive on the main liquid material present in the bottle.

The applicant has studied the value of the first angle β to limit splashing as much as possible. Although the optimal value of the first angle β depends on many parameters, such as the shape of the container and the rotation speed of the rotary wheel which determines the speed of the container on its trajectory T, general indications can be given. The first angle β is advantageously a negative acute angle. The jet is thus oriented in a direction towards the axis of rotation A, and reaches the lateral inner wall 11 of the container on the side where the main liquid material has the lowest level. Consequently, the free inner wall has the biggest height, measured between the free surface 8 of the main liquid material and the opening 9, on the side of the container that is the closest to the rotation axis A. For a conventional bottle the applicant has found that the first angle β is preferably comprised between −60° and −5°, preferably between −40° and −15°, and more preferably between −30° and −25°.

Figure 4:
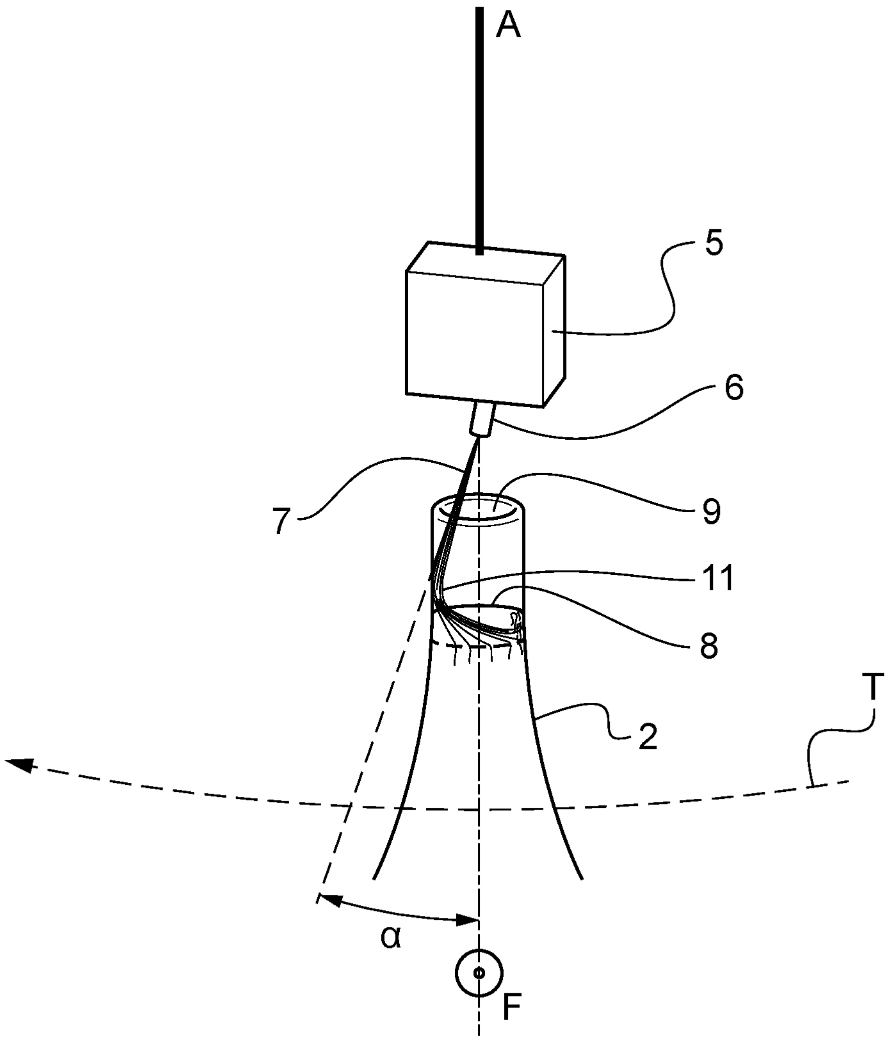
FIG. 4 is a is a three-dimensional schematic view showing a static microdoser installed above a rotary wheel to introduce an additive into a container, according to a second embodiment of the invention.

FIG. 4 shows, according to a view similar to FIG. 2 and FIG. 3, an embodiment of the invention. FIG. 4 is similar to FIG. 2 and FIG. 3 in that the configuration of the system for introducing an additive into a partially filled container is generally similar, and the elements represented or omitted in those Figures are the same, but the point of view is different. In FIG. 4, the point of view is situated in the plane in which the axis of rotation A and the static microdoser 5 are aligned (i.e. the plane used to define the first angle β by orthogonal projection of the direction of the jet 7).

The static microdoser 5 has, in embodiments of the invention, a nozzle 6 inclined to generate a jet 7 of additive that is also inclined at a second angle α. The second angle α corresponds to the orientation of the nozzle 6 (and consequently of the jet 7) relative the vertical direction, substantially in the plane tangent to the circular trajectory T.

More precisely defined, the second angle α is such that the orthogonal projection of the direction of the jet of additive on a plane which:

- contains the nozzle,
- is parallel to the axis of rotation of the rotary wheel, and
- is orthogonal to a plane containing the axis of rotation of the rotary wheel and the nozzle, forms the second angle α with a line parallel to said axis of rotation and passing through the nozzle.

As for the definition of the first angle β, this definition of α applies to an embodiment of the invention in which the additive is introduced into a container when this container is transported in a horizontal plane by a rotary wheel The second angle α is more generally defined such that the orthogonal projection of a direction of the jet 7 of additive on a plane which:

- contains the nozzle 6,
- is vertical, and
- is orthogonal to a plane containing the nozzle 6 and which is orthogonal to a tangent of the trajectory T, forms the second angle α with a vertical line passing through the nozzle 6.

These definitions of α are consistent.

The second angle α is considered by convention positive when the jet is inclined in a direction substantially opposite to the movement of the container in the horizontal plane, The applicant has studied the value of the second angle α to limit splashing as much as possible. It arises that in most cases the relative speed between the jet 7 and the lateral inner wall 11 of the container hit by said jet should be reduced to limit the risk of splashing. More generally, a second angle α of 0° is often adequate, but the second angle α can be adjusted optimize the spiraling flow of the additive on the inner wall of the container before it reaches the surface 8 of the main liquid material.

Figure 5:
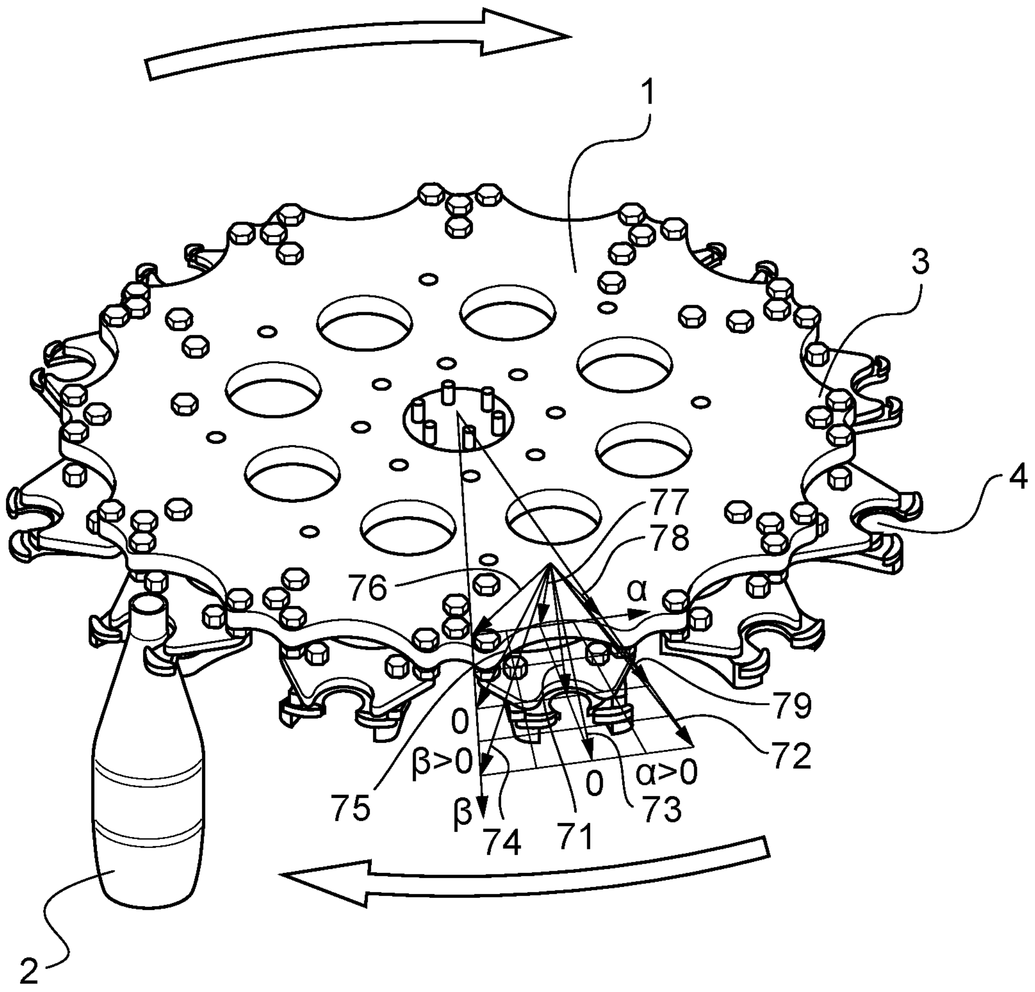
FIG. 5 is a three-dimensional schematic view of a rotary wheel for transporting a container, wherein principles developed in the present invention are schematically represented.

FIG. 5 shows a rotary wheel 1 for transporting a container 2, namely a bottle, as represented in FIG. 1, and further illustrates the inclination used in the invention of the nozzle and of the jet of a static microdoser, said inclination being defined by the first angle β and by the second angle α.

Several possible directions of the jet 7 which issues from the static microdoser nozzle are represented in FIG. 5. A three-dimensional grid, centered on a holding means 4 is represented to help understanding the jet direction.

The first jet direction 71 corresponds to the direction of a jet according to the prior art.

The following jet directions are also represented:

- a second jet direction 72, wherein the first angle β is positive and the second angle α is positive.
- a third jet direction 73, wherein the first angle β is positive and the second angle α is zero;
- a fourth jet direction 74, wherein the first angle β is positive and the second angle α is negative;
- a fifth jet direction 75, wherein the first angle β is zero and the second angle α is negative.
- a sixth jet direction 76, wherein the first angle β is negative and the second angle α is negative;
- a seventh jet direction 77, wherein the first angle β is negative and the second angle α is zero;
- a eighth jet direction 78, wherein first angle β is negative and the second angle α is positive;
- a ninth jet direction 79, wherein the first angle β is zero and the second angle α is positive.

The best results, in terms of limitation of splashing, have been found with the seventh jet direction 77, and with the sixth and eighth jet directions 76, 78.

In the present disclosure, additive should be understood as designating a liquid in an amount up to 5%, preferably 0.05% to 1%, preferably 0.1% to 0.5% by volume, of the main liquid material in the final product. As non-exhaustive examples, additive can be a flavor or aroma (for example orange, peach, lemon, etc.), a tea or coffee extract, a fruit juice, a minerals mother solution, etc. The additive can be a mineral liquid concentrate, or a so-called "functional" concentrate such as an additive comprising a vitamin, caffeine or another coffee and/or tea extract. The expression "functional concentrate" refers to a product that has an effect on the consumer, such as a product that is probiotic, prophylactic, etc.

Additionally, the additive can be liquid carbon dioxide or liquid nitrogen according to the required use as known by the skilled person.

Figure 6:
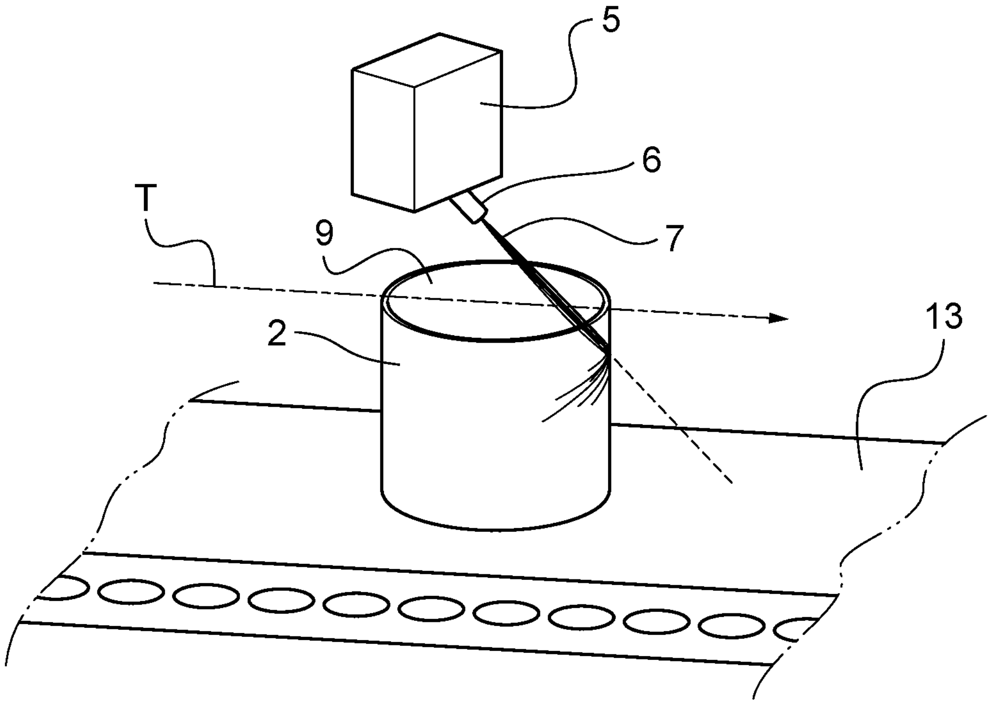
FIG. 6 is a three-dimensional schematic view showing a static microdoser installed above a conveyor to introduce an additive into a container, according to a third embodiment of the invention.

FIG. 6 shows another example embodiment of the invention. According to this embodiment, a conveyor 13, namely a conveyor belt, is used to transport containers 2 to be filled with an additive and a main liquid material. A static microdoser is installed above the conveyor 13, and more particularly above the trajectory described by the opening 9 of the container 2.

In the present embodiment, the container 2 is a can, e.g. an aluminium can, having an open top face as opening. In the represented embodiment, the container 2 is empty when it passes in proximity to the microdoser 5 for introduction of additive. Alternatively, as described above, the container can be partially filled with a main liquid material before additive is introduced.

When the container is partially filled with a main liquid material before additive is introduced, the conveyor can optionally be configured to apply an acceleration to the container and the contained main liquid material, to incline the free surface of the main liquid material present in the container. Such acceleration can be applied in any direction, and can be used to free a given height of inner wall of the container above the surface of the main liquid material to allow a jet of additive to hit an inner wall that is free of main liquid material.

The nozzle 6 is inclined relative to the vertical direction, i.e. relative to the horizontal plane defined by the upper surface of the conveyor 13. The nozzle 6 is inclined to generate a jet 7 of additive that is also inclined relative to the vertical direction.

As in the example embodiments of FIG. 3 and FIG. 4, the jet 7 may be inclined according to the first angle β and/or according to the second angle α.

The first angle β is defined such that the orthogonal projection of a direction of the jet of additive on a plane which:

contains the nozzle 6,
is vertical, and
is orthogonal to a tangent of the trajectory;

Forms the first angle β with a vertical line passing through the nozzle

If the trajectory T is linear (i.e. straight), as in the present case, the tangent of the trajectory coincides with the trajectory T.

The second angle α is defined, as above detailed, such that the orthogonal projection of a direction of the jet 7 of additive on a plane which:

contains the nozzle 6,
is vertical, and
is orthogonal to a plane containing the nozzle 6 and which is orthogonal to a tangent of the trajectory T, forms the second angle α with a vertical line passing through the nozzle 6.

If the trajectory T is linear (i.e. straight), as in the present case, the tangent of the trajectory coincides with the trajectory.

The second angle α is considered by convention positive when the jet is inclined in a direction substantially opposite to the movement of the container. The first angle β is oriented such that β is negative if the jet is inclined towards the inside of a curved formed by the trajectory T, or arbitrary if the trajectory is straight.

Figure 7:
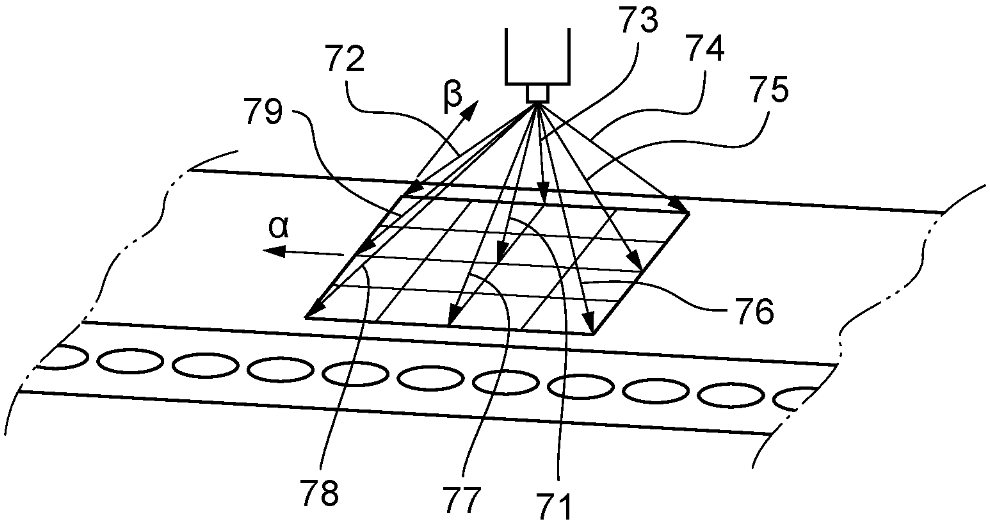
FIG. 7 is a three-dimensional schematic view of a conveyor for transporting a container, wherein principles developed in the present invention are schematically represented.

FIG. 7 represents several possible directions of the jet 7 which issues from the static microdoser nozzle 6. A three-dimensional grid, centered on a vertical axis passing through the center of the nozzle 6 is represented to help understanding the jet direction.

The first jet direction 71 corresponds to the direction of a jet according to the prior art.

The following jet directions are also represented:

a second jet direction 72, wherein the first angle β is positive and the second angle α is positive.
a third jet direction 73, wherein the first angle β is positive and the second angle α is zero;
a fourth jet direction 74, wherein the first angle β is positive and the second angle α is negative;
a fifth jet direction 75, wherein the first angle β is zero and the second angle α is negative.
a sixth jet direction 76, wherein the first angle β is negative and the second angle α is negative;
a seventh jet direction 77, wherein the first angle β is negative and the second angle α is zero;
an eighth jet direction 78, wherein first angle β is negative and the second angle α is positive;
a ninth jet direction 79, wherein the first angle β is zero and the second angle α is positive.

Figure 8:
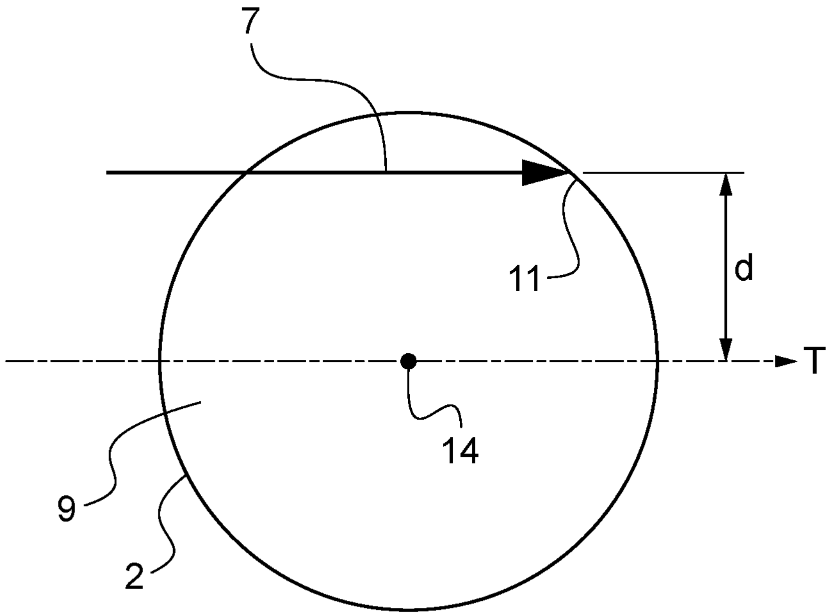
FIG. 8 is a schematic view of a container seen from above, wherein another principle developed in the present invention is represented.

FIG. 8 represents a container, namely a can, seen from above. A can having a circular cylindrical shape has a circular form seen from above. The circle represented in FIG. 8 also corresponds to the opening 9 of the container 2, this opening being an opened top face of the can. The can has a central axis 14.

A purpose of the inclined jet of additive is to avoid the jet hitting the container or a main liquid material contained in said container with an orthogonal impact angle. As represented in FIG. 8, the static microdoser and its nozzle may be positioned such that the jet 7 of additive crosses opening 9 of the container 2 at a distance d from its central axis. This distance d, also called offset, allow the jet to reach the lateral inner wall 11 of the container 2 with a tangential component relative to the inner wall, if said lateral inner wall is circular or at least rounded. The jet will thus tend to follow said lateral inner wall and to spiral down to the bottom of the container 2.

Depending on the quantity of additive that must be introduced in each container, the available time for injection (during which the opening 9 of the container 2 faces the nozzle 6 of the microdoser) may not be sufficient to inject said quantity of fluid without splashing. This is for example the case in high-speed industrial applications, in which the available dosing time is for example below 0.1 second and in which the quantity of additive to introduce is more than 1 ml. In such cases, use of a static microdoser assembly comprising a plurality of nozzles may be necessary.

Figure 9:
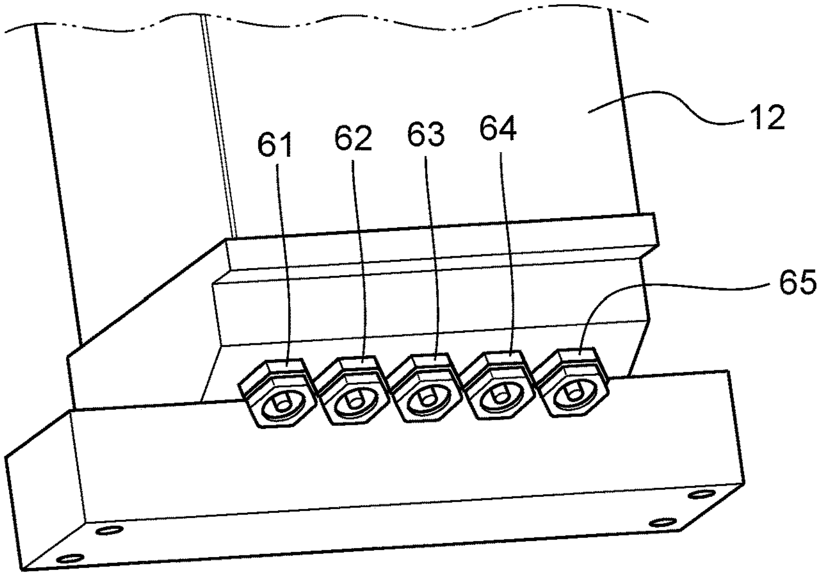
FIG. 9 is a three-dimensional schematic view of a microdoser assembly comprising a plurality of nozzles, that can be used in embodiments of the invention.

FIG. 9 shows an example embodiment of such static microdoser assembly 12. The static microdoser assembly 12 comprises a plurality of nozzles 61, 62, 63, 64, 65. The static microdoser assembly can be considered as a plurality of microdosers, embedded in the represented embodiment as a single apparatus. In other embodiments, a plurality of separate microdosers can be used.

Each nozzle 61 . . . 65 is responsible for injection of a predefined portion of the total quantity of fluid additive that has to be introduced into the container 2. The position and the orientation of each nozzle 61 . . . 65 of the static microdoser assembly 12 are individually optimized for injection. More particularly, each nozzle is oriented at the same first angle β and at the same second angle α as defined above. In other words, the position and the inclination of each nozzle is optimised to the trajectory T of the container.

Figure 10:
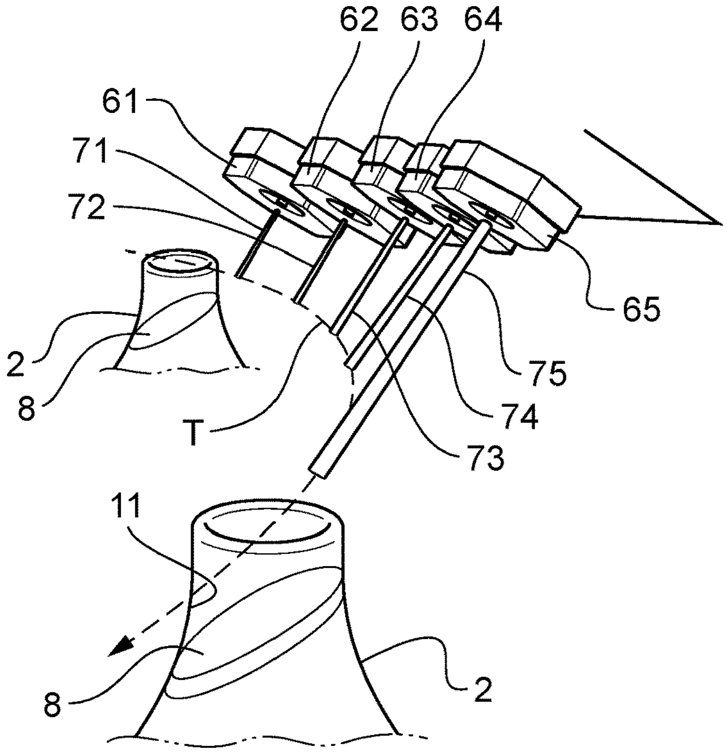
FIG. 10 is a three-dimensional schematic view of the nozzles of the microdoser assembly of FIG. 6, and represents how the successive injections performed by the nozzles of said assembly are performed.

As the trajectory T followed by the container 2 is an arc-shaped trajectory, the nozzles are also positioned on a circular arc as shown in FIG. 10 which shows the plurality of nozzles 61 . . . 65 and a same container 2 at two successive times along its trajectory T. Each jet 71 . . . 75 respectively issued from each nozzle 61 . . . 65 is represented. FIG. 10 shows how the jets 71 . . . 75 are each centered on the trajectory T followed by the opening 9 of the container 2. This optimizes the time available for the additive injection upon passage of the container 2. The container 2 successively passes under the first nozzle 61, the second nozzle 62, and so on. In the represented embodiment, each jet 71 . . . 75 has the same inclination relative to the position of the container 2 when the container passes under the nozzle. Consequently, each jet hits the lateral inner wall 11 of the container situated on the side of the container where level of the main liquid material is the lowest due to the centrifugal force applied to said main liquid material.

It should be understood that various changes and modifications to the presently preferred embodiments described herein will be apparent to those skilled in the art. Such changes and modifications can be made without departing from the spirit and scope of the present invention and without losing its attendant advantages. It is therefore intended that such changes and modifications be covered by the appended claims.

For example, while a rotary wheel or a conveyor are the preferred automated devices for transporting a container in a system according to the invention, other devices can be used. Furthermore, while centrifugal force can be used in the invention, other types of acceleration can be applied to the container and contained main liquid material. Also, the number of nozzles can be adapted to the considered application.

The invention finds a preferred, but of course not exclusive, application in the introduction of a flavoring concentrate in a bottle of water to obtain flavored water.

The invention claimed is:

1. A system for introducing an additive into a container, the system comprising an automated device for transporting the container along a trajectory in a horizontal plane, the system further comprising a static microdoser having a nozzle from which a jet of the additive issues upon passage of an opening of the container in proximity to the nozzle to introduce the additive into said container, and the nozzle of the static microdoser is inclined relative to a direction orthogonal to said horizontal plane, wherein the nozzle of the static microdoser is inclined such that the jet of the additive enters into the container through the opening and hits a lateral inner wall of said container, wherein the container is partially filled with a main liquid material before introduction of the additive, and wherein the lateral inner wall hit by the jet of the additive is situated above a free surface of the main liquid material.

2. The system according to claim 1, wherein the automated device for transporting the container comprises a conveyor configured to transport the container along a linear or curved trajectory.

3. The system according to claim 1, wherein the lateral inner wall of the container has a rounded or cylindrical shape, the container having a central axis, wherein the static microdoser is positioned such that the jet of the additive crosses the opening of the container at a distance from the central axis of the container.

4. The system according to claim 1, wherein the container is a bottle having a mouth as the opening or a can having an open top face for filling.

5. The system according to claim 1, wherein the main liquid material is selected from the group consisting of water, a soda, lemonade, and a soup.

6. The system according to claim 1, wherein the additive is an edible flavoring concentrate, a mineral concentrate, or a functional concentrate.

7. The system according to claim 1, wherein the automated device for transporting the container applies an acceleration to said container, said acceleration having at least a horizontal component causing the free surface of the main liquid material to be at an angle with the horizontal plane, the free surface of the main liquid thus having a highest level and a lowest level in the container, the nozzle of the static microdoser being placed such that the jet of the additive hits the lateral inner wall on the side of the container where the level of main liquid material is the lowest.

8. The system according to claim 7, wherein the automated device for transporting the container comprises a rotary wheel which transports the container along a circular-arc-shaped trajectory around an axis of rotation of the rotary wheel, thus applying a centrifugal force on the container, said centrifugal force forming the horizontal component of the acceleration on said container.

9. The system according to claim 1, wherein the system comprises a microdoser assembly comprising a plurality of static microdoser nozzles along the trajectory of the container, each of the plurality of static microdoser nozzles having a same inclination relative to the container upon passage of the opening of the container.

10. The system according to claim 9, wherein the plurality of static microdoser nozzles comprises between two and six static microdoser nozzles.

11. The system according to claim 1, wherein the nozzle is inclined such that the orthogonal projection of a direction of the jet of the additive on a vertical plane containing the nozzle and which is orthogonal to a tangent of the trajectory forms a first angle $\beta$ with a vertical line passing through the nozzle, and wherein the first angle $\beta$ is an acute angle.

12. The system according to claim 11, the first angle $\beta$ being said to be negative when the jet is substantially directed towards the axis of rotation, and wherein the first angle $\beta$ is a negative angle.

13. The system according to claim 12, wherein the first angle $\beta$ is comprised between −60° and −5°.

14. The system according to claim 11, wherein the nozzle is inclined such that the orthogonal projection of a direction of the jet of the additive on a plane which:

contains the nozzle, is vertical, is orthogonal to a plane containing the nozzle and which is orthogonal to a tangent to the trajectory, and forms a second angle $\alpha$ with a vertical line passing through the nozzle.

15. The system according to claim 14, the second angle $\alpha$ being considered positive when the jet is inclined in a direction substantially opposite to the movement of the container in the horizontal plane, wherein the second angle $\alpha$ is comprised between −10° and 10°.

16. A method for preparation of a bottled liquid product, the method comprising:

transporting a container along a trajectory in a horizontal plane;

injecting from a nozzle of a static microdoser, during the transporting step, an additive into the container as a jet of additive inclined relative to a direction orthogonal to said horizontal plane, wherein the nozzle of the static microdoser is inclined such that the jet of the additive enters into the container through an opening of the container and hits a lateral inner wall of said container, wherein the container is partially filled with a main liquid material before the injecting of the additive, and wherein the lateral inner wall hit by the jet of the additive is situated above a free surface of the main liquid material.

17. The method according to claim 16, wherein the main liquid material is selected from the group consisting of water, a soda, lemonade, and a soup.

18. The method according to claim 16, wherein the additive is an edible flavoring concentrate, a mineral concentrate, or a functional concentrate.

19. The method according to claim 16, wherein the transporting of the container applies an acceleration to said container, said acceleration having at least a horizontal component causing the free surface of the main liquid material to be at an angle with the horizontal plane, the free surface of the main liquid thus having a highest level and a lowest level in the container, the nozzle of the static micro-doser being placed such that the jet of the additive hits the lateral inner wall on the side of the container where the level of main liquid material is the lowest.

20. The method according to claim 19, wherein the transporting of the container comprises a rotary wheel transporting the container along a circular-arc-shaped trajectory around an axis of rotation of the rotary wheel, thus applying a centrifugal force on the container, said centrifugal force forming the horizontal component of the acceleration on said container.

* * * * *